E. Broad,
Auger Handle.
No. 90,919. Patented June 8, 1869.
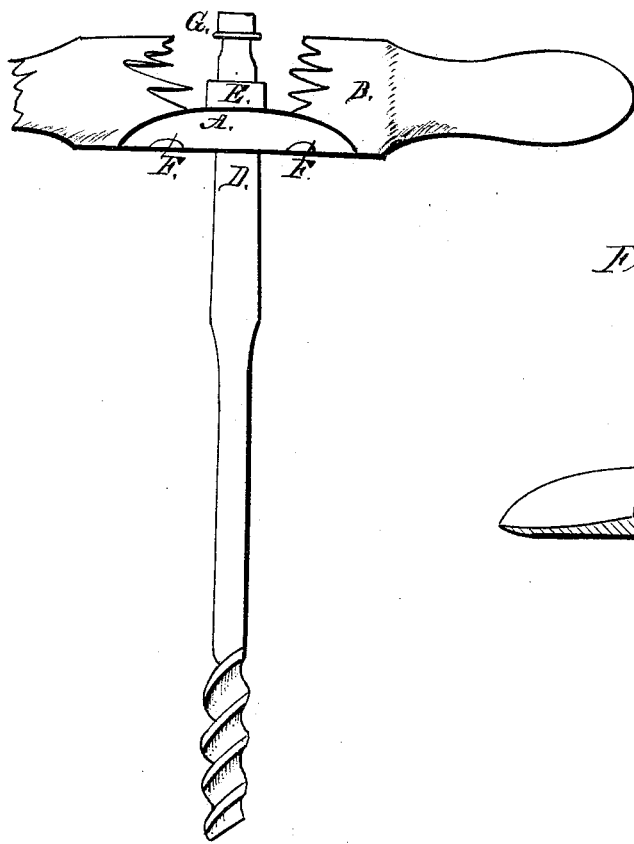
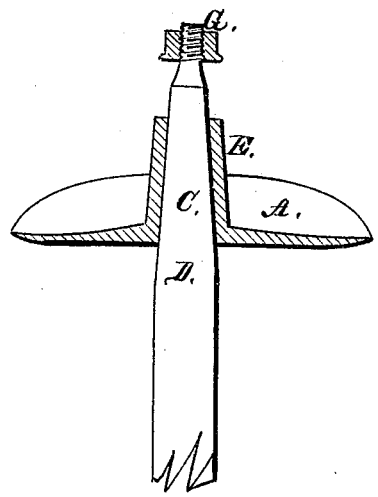
Witnesses:
H. F. Eberts.
G. C. Clyde.
Inventor:
E. Broad
by
Thos. S. Sprague

United States Patent Office.

ELISHA BROAD, ST. ANTHONY, MINNESOTA.

*Letters Patent No. 90,919, dated June 8, 1869; antedated June 3, 1869.*

IMPROVEMENT IN ATTACHING AUGERS TO HANDLES.

The Schedule referred to in these Letters Patent and making part of the same.

*To whom it may concern:*

Be it known that I, ELISHA BROAD, of St. Anthony, in the county of Hennepin, and State of Minnesota, have invented a new and useful Improvement in Handles for Augers and other similar Tools; and I do declare that the following is a true and accurate description thereof, reference being had to the accompanying drawings, and to the letters of reference marked thereon, and being a part of this specification.

Figure 1 shows my invention as it appears when ready for use.

Figure 2 is a sectional view of a part of the same, detached from the handle proper.

Like letters indicate like parts in each figure.

The object of this invention is so to construct a handle for the purpose indicated that will prevent the shank of an auger, or similar tool, from wearing away the wood part of the handle; that will enable the operator to change the handle from one auger-bit to another without loss of time; that will be durable, economical to manufacture, and that will fit almost any size of auger.

In order to accomplish this end, I construct a concave plate, A, of the proper shape and size to fit the under side of the wooden handle B, and provided, at its centre, with a square hole, C, of the proper size to fit the shank D of an auger.

To this plate is attached, in any suitable manner, the socket E, tapering in form, to suit the taper of the shank D.

The socket is provided with a square hole through the same, corresponding to the similar C in the plate A, and is let into the handle B, to which it is fastened by the screws, or rivets F.

The upper end of the shank may be fitted with a nut, G, to prevent the shank from dropping out of the handle.

It can be seen at a glance, that by this device, the auger is held almost as firm as though it was provided with a handle of solid iron, and that there is no possible way for it to become loose. It will undoubtedly last longer than twenty of the common wooden handles.

A complete set of augers can be fitted to one handle, and the handle can be changed from one auger to another in a very small space of time.

The plate and socket may be made of cast or wrought-metal, as may be desired.

What I claim as my invention, and desire to secure by Letters Patent, is—

The plate A, when constructed, as shown, with the socket E, as herein described.

ELISHA BROAD.

Witnesses:
S. M. MOORE,
WM. W. WOODBURY.